United States Patent
Sayag

(10) Patent No.: US 8,523,355 B2
(45) Date of Patent: Sep. 3, 2013

(54) METHOD AND DEVICE FOR MEASURING THE CURVE OF A SPECTACLE FRAME

(75) Inventor: Jean-Philippe Sayag, Paris (FR)

(73) Assignee: ACEP France, Paris (FR)

( * ) Notice: Subject to any disclaimer, the term of this patent is extended or adjusted under 35 U.S.C. 154(b) by 780 days.

(21) Appl. No.: 12/667,883

(22) PCT Filed: Jul. 3, 2007

(86) PCT No.: PCT/FR2007/051580
§ 371 (c)(1),
(2), (4) Date: Jan. 6, 2010

(87) PCT Pub. No.: WO2008/003897
PCT Pub. Date: Jan. 10, 2008

(65) Prior Publication Data
US 2010/0231710 A1 Sep. 16, 2010

(30) Foreign Application Priority Data
Jul. 6, 2006 (FR) ...................................... 06 06164

(51) Int. Cl.
*A61B 3/10* (2006.01)
(52) U.S. Cl.
USPC .......................................... 351/204; 351/246

(58) Field of Classification Search
USPC ................................................. 351/204, 246
See application file for complete search history.

(56) References Cited

U.S. PATENT DOCUMENTS
5,908,348 A * 6/1999 Gottschald ........................ 451/5
2002/0053143 A1 5/2002 Fuhrmann FOREIGN PATENT DOCUMENTS
EP 0 689 900 A1 1/1996
EP 1 316 837 A1 6/2003
EP 1316837 A1 * 6/2003

OTHER PUBLICATIONS
D'Alessandro, Davide, International Search Report, Jan. 21, 2008, EPO, Rijswijk, Netherlands.

* cited by examiner

Primary Examiner — Sath V Perungavoor
Assistant Examiner — Jeffery Williams
(74) *Attorney, Agent, or Firm* — BCF LLP

(57) ABSTRACT

The invention relates to a method for measuring the curve of a spectacle frame (4) comprising the following operations: determining the position of a first reference mark (18) defining the mid plane of the spectacle frame (4); determining the position of a second reference mark (20) defining the orientation of a spectacle lens holder relative to said mid plane; and measuring the angle between said first and second reference marks. The invention also relates to a device for carrying out the method.

6 Claims, 2 Drawing Sheets

METHOD AND DEVICE FOR MEASURING THE CURVE OF A SPECTACLE FRAME

This invention relates to a method and a device for measuring the curve of a spectacle frame.

Until recently, spectacle lenses were machine tooled without taking the curve of the spectacle frame into account. This resulted in a distortion of the vision in the peripheral portion of the lens, i.e. at the right end for the right lens and at the left end pour the left lens.

The manufacturing techniques of spectacle lenses have become refined and now make it possible to take the curve of the frame into account. This makes it possible to offer the spectacle wearer more precise vision in the peripheral zones.

However, measuring the curve of a frame according to prior art is still imperfect.

Figure 1:
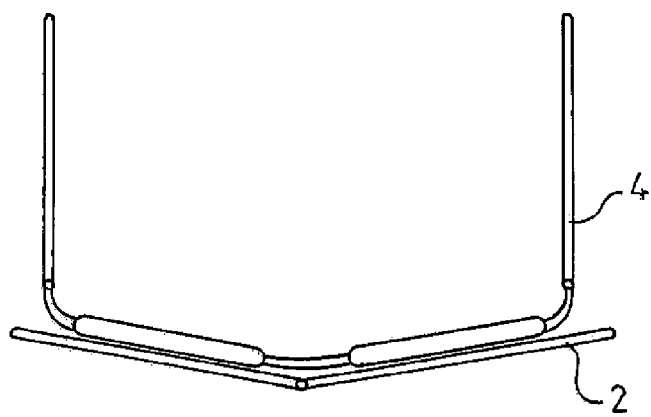

FIG. 1 schematically shows such a known means for measuring. It has the form of a compass 2 that the optician applies against the spectacle frame 4 in order to determine its curve. Such a measurement has disadvantages. It is first of all required that the optician be trained to take such a measurement. In addition, entailing a measurement that requires the intervention of a person, the latter is not reliable (i.e. it is not reproducible). Finally, this measurement requires a non-negligible amount of time.

The invention has for purpose to overcome the disadvantages of prior art.

To this end, the purpose of the invention is a method for measuring the curve of a spectacle frame comprising the operations consisting in:
  determining the position of a first reference mark defining the mid plane of the spectacle frame,
  determining the position of a second reference mark defining the orientation of a spectacle lens holder in relation to said mid plane, and
  measuring the angle between said first and second reference marks, this angle defining the curve of the spectacle frame.

The invention also has for purpose a device for measuring the curve of a spectacle frame, said device comprising a first positioning element provided with a first reference mark, which can be adjusted on a spectacle frame in order to define a mid plane of said spectacle frame, and a second positioning element provided with a second reference mark, which can be adjusted on the spectacle frame in order to define an orientation of a spectacle lens holder.

Advantageously, at least one of the first or second positioning elements can be formed directly by a portion of the spectacle frame itself.

Alternatively, the first and second positioning elements are adjusted on the spectacle frame and are pivoting in relation to one another.

The device according to the invention further comprises means for determining the angle formed by said first and second reference marks when the first and second positioning elements are adjusted on a spectacle frame.

These means for determining include more preferably means for capturing an image, such as a camera, and digital means for analysing an image.

Figure 3:
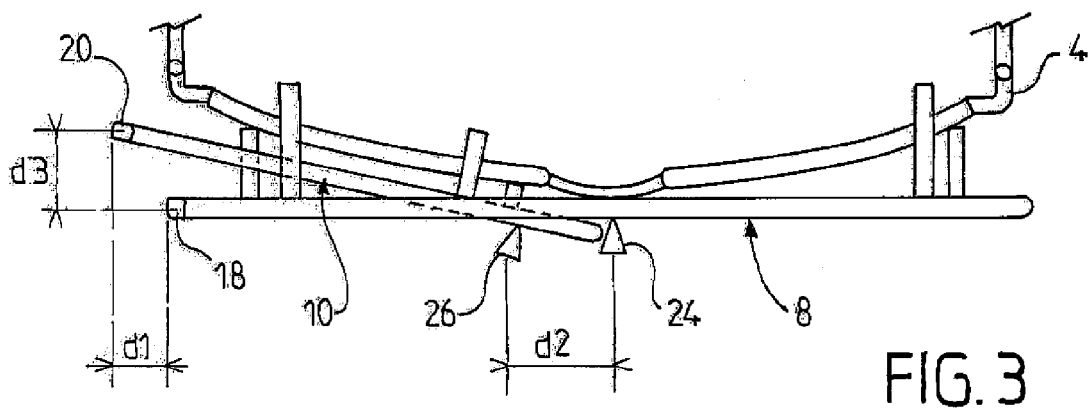
Figure 4:
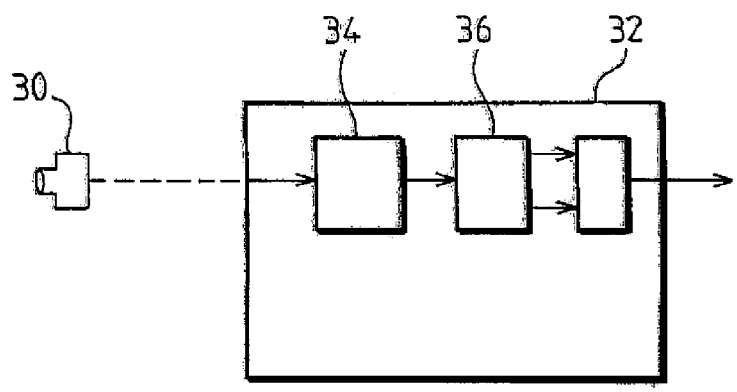
Figure 2A:
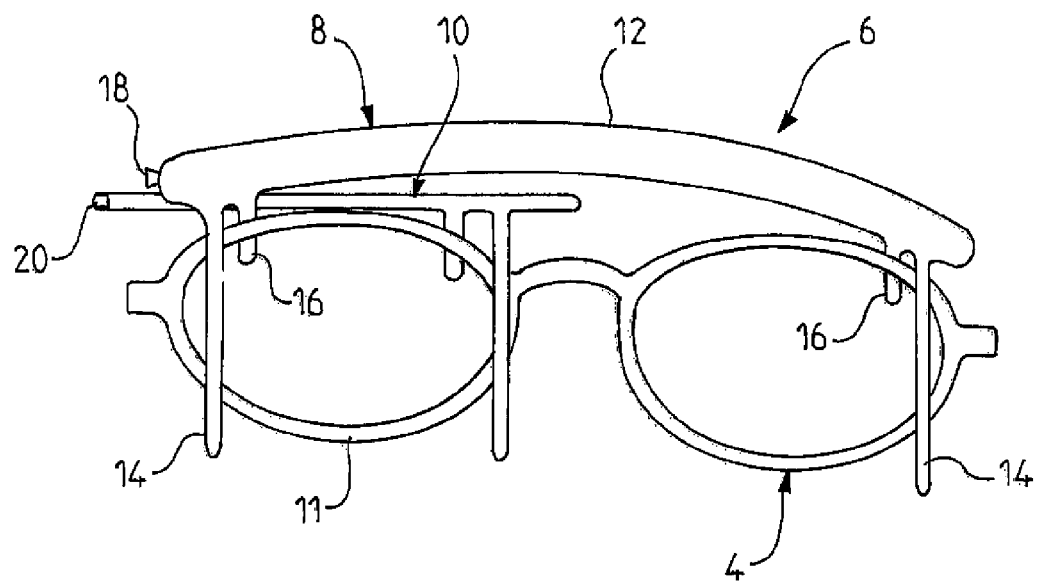
Figure 2B:
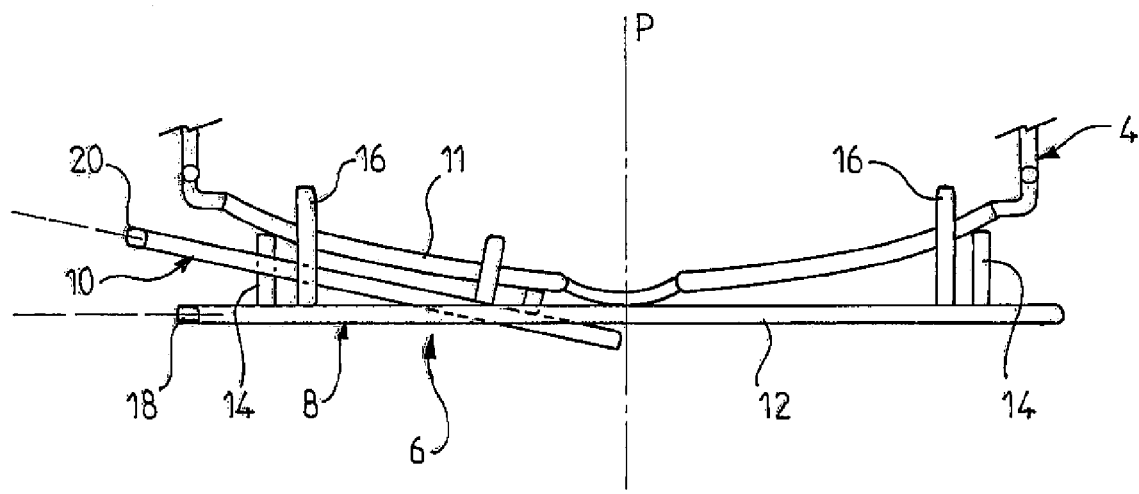

By way of a non-restrictive example, an embodiment of this invention shall be described hereinafter, in reference to the annexed drawing wherein:

FIG. 1, already described, is a top view which shows the measurement of the curve of a spectacle frame according to prior art, FIGS. 2a and 2b show respectively as a front view and as a top view a spectacle frame whereon is mounted a device for measuring the curve according to a first embodiment of the invention, FIG. 3 shows in a non-restrictive manner a few parameters which can be used to determine the curve of a spectacle frame, and FIG. 4 schematically shows a device for measuring in accordance with the invention.

On the spectacle frame 4 shown in the FIGS. 2a and 2b, a device 6 according to the invention has been adjusted. This device comprises a first positioning element 8 and a second positioning element 10. The first positioning element 8 has the form of a substantially horizontal bridge 12 of which the ends are each provided with a first branch 14 against which the front surface of the spectacle frame presses against and a second branch 16 which presses against the rear surface of the spectacle frame.

The first positioning element 8 is provided with at least one reference mark 18 of which the position is used during the measurement of the curve, this position making it possible to define the mid plane of the frame. By mid plane is meant a vertical plane perpendicular to the plane of symmetry P of the spectacle frame. In the embodiment shown, the reference mark 18 is arranged at one end of the bridge 12. It can also be placed at another location, and for example at the centre of the bridge 12 such as the reference mark 24 in FIG. 3).

The device 6 comprises a second positioning element 10. The latter is intended to make it possible to determine the orientation of the lens holder 11 in relation to the mid plane of the frame.

This second positioning element 10 is adjusted on one of the two lens holders of the frame. It comprises a reference mark 20 of which the position is according to the curvature of the spectacle frame. In the embodiment shown, this reference mark 20 is placed at one end of the second positioning element 10. It is in the example shown mounted in a pivoting manner on the first positioning element 8 by the intermediary of a pivot 22 provided on one of the first branches 14 of the first positioning element 8.

Knowing the relative positions of the two reference marks, the curve of the frame can be determined easily. FIG. 3 shows a few examples of parameters with which the curve can be determined.

The means for determining are more preferably automated and include as shown by way of example in FIG. 4 the use of a means for capturing an image 30, for example a camera, and a digital means for analysing an image 32. This means 32 comprises a module for storing 34 in order to receive a captured image and a module for processing 36 in order to calculate, using the position of the reference marks in the captured image, the curve of the spectacle frame.

Note that the measuring of the curve is performed without the patient having to wear the frame. As such, the practitioner can position the spectacle frame precisely and in a reproducible manner in relation to the means for capturing an image. The distance and the orientation of the positioning elements in relation to means for capturing an image are as such perfectly known. Consequently, the relative position of the first and second reference marks makes it possible for the module for processing images to determine the curve of the frame.

As such, it is for example possible to place the spectacle frame with its front surface on the side of the means for capturing an image. On the front image captured, the apparent distance d1 between the reference marks 18 and 20 is directly linked to the curve of the spectacle frame. With the spectacle frame in the same position, the curve can also be measured by measuring the apparent distance d2 between a first reference mark 24 placed in the centre of the first positioning element 8, and on its front surface, and a second reference mark 26 also placed on the front surface of the second positioning element 10.

Measuring the curve of the spectacle frame could also be carried out by placing it in such a way that a branch of the frame is across from the means for capturing an image. The measurement of the apparent distance d3 between the reference marks 18 and 20 determines the curve of the spectacle frame.

Note that the reference marks can be of very diverse forms, textures and colours. It is only important that they be chosen in a way that they can be easily detected by the means for processing an image.

In particular, it can be advantageous to provide reference marks of tapered form (reference marks 24 and 26) of which the base is intended to be turned towards the means for capturing an image. The ovalisation of the spherical base of the reference mark 26 such as is seen by the means for capturing an image makes it possible to refine the measurement of the curve.

In the embodiments shown, the reference marks are on positioning elements which are adjustable in a removable manner on the spectacle frame.

Such positioning elements can be used with practically any spectacle frame.

It can also be provided that the reference marks be fixed on the pair of spectacles or be an integral part thereof, for example in the form of geometric elements (circle, triangle, etc.) with a primarily decorative purpose.

The invention claimed is:

1. A device for measuring the curve of a spectacle frame, said device comprising:
   a first positioning element being adjustable on the spectacle frame and being provided with a first reference mark in order to define a mid plane of said spectacle frame, the first positioning element having a form of a substantially horizontal bridge, the bridge having ends, each end being provided with a first branch adapted to press against a front surface of the spectacle frame and a second branch adapted to press against a rear surface of the spectacle frame; and
   a second positioning element being adjustable on the spectacle frame and being provided with a second reference mark in order to define an orientation of a spectacle lens holder.

2. The device according to claim 1, wherein the first and second positioning elements are pivotally mounted together.

3. The device according to claim 1, further comprising means for determining an angle formed by said first and second reference marks when the first and second positioning elements are adjusted on the spectacle frame.

4. The device according to claim 3, wherein said means for determining include means for capturing an image and digital means for analysing an image.

5. The device according to claim 2, further comprising means for determining an angle formed by said first and second reference marks when the first and second positioning elements are adjusted on the spectacle frame.

6. The device according to claim 3, wherein said means for determining include means for capturing an image and digital means for analysing an image.

* * * * *